(12) United States Patent
Davis et al.

(10) Patent No.: US 9,085,357 B2
(45) Date of Patent: Jul. 21, 2015

(54) ROTOR HUB BEARING SYSTEM

(75) Inventors: Hunter Davis, Fort Worth, TX (US);
Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 881 days.

(21) Appl. No.: 13/296,974

(22) Filed: Nov. 15, 2011

(65) Prior Publication Data

US 2013/0121828 A1    May 16, 2013

(51) Int. Cl.
*B64C 27/35* (2006.01)

(52) U.S. Cl.
CPC .................... *B64C 27/35* (2013.01)

(58) Field of Classification Search
CPC ... F03D 1/0658; F03D 11/0008; B64C 11/04; B64C 11/06; B64C 11/065; B64C 11/12; B64C 11/30; B64C 27/35; B64C 27/51
See application file for complete search history.

(56) References Cited

U.S. PATENT DOCUMENTS

| | | | | |
|---|---|---|---|---|
| 3,862,812 | A | * | 1/1975 | Gorndt et al. ................. 416/141 |
| 4,257,739 | A | * | 3/1981 | Covington et al. ....... 416/134 A |
| 5,110,259 | A | * | 5/1992 | Robinson ................. 416/134 A |
| 2006/0067823 | A1 | * | 3/2006 | Pancotti .................... 416/134 A |

* cited by examiner

*Primary Examiner* — Dwayne J White
*Assistant Examiner* — Adam W Brown
(74) *Attorney, Agent, or Firm* — James E. Walton; Damon R. Hickman (57) ABSTRACT

The bearing system is configured for treating and reacting dynamic loading within a rotor hub of rotorcraft. The bearing system includes an outer member having a plurality of alternating outer elastomeric layers and shim layers. The outer member has an inboard surface configured for bonding to an inboard bearing support, and the outer member has an outboard surface configured for bonding to an outboard bearing support. The bearing system has an inner member bonded to an interior surface of the outer member. The inner member can include a rigid inner core, as well as a plurality of elastomeric layers and shim layers configured to react torsional movements of the rotor blade.

10 Claims, 9 Drawing Sheets

ROTOR HUB BEARING SYSTEM

BACKGROUND

1. Technical Field

The present application relates to a bearing system for a rotor hub.

2. Description of Related Art

Rotorcraft can include one or more elastomeric bearings located in the rotor hub for reacting dynamic motions of the rotor blade. One such spherical bearing can include an outer member having spherically positioned elastomeric and shim layers, surrounding a solid inner member. Such a bearing typically must be sized and configured with the outer member having a stiffness for treating all flapping motions, lead/lag motions, and torsional motions of the rotor blade. As such, the bearing size is typically determined by the most severe dynamic motion and can't be specifically tailored for more than one dynamic motion.

Hence, there is a need for an improved bearing that can be more efficiently sized and specifically tailored in accordance with predicted dynamic motions.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
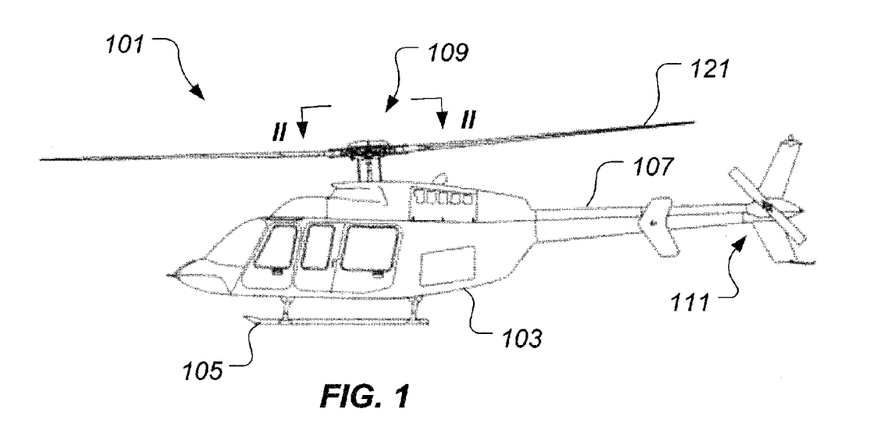
FIG. 1 is a side view of a rotorcraft having a main rotor hub with a bearing system, according to an illustrative embodiment of the present application.

Referring to FIG. 1, an exemplary rotorcraft 101 is illustrated. Rotorcraft 101 includes a fuselage 103, a landing gear 105, a tailboom 107, a main rotor hub 109, and a tail rotor hub 111. Main rotor hub 109 is configured for engagement of a plurality of rotor blades 121. During operation of rotorcraft 101, the pitch of each rotor blade 121 is selectively controlled in order to selectively control direction, thrust, and lift of rotorcraft 101.

Figure 2:
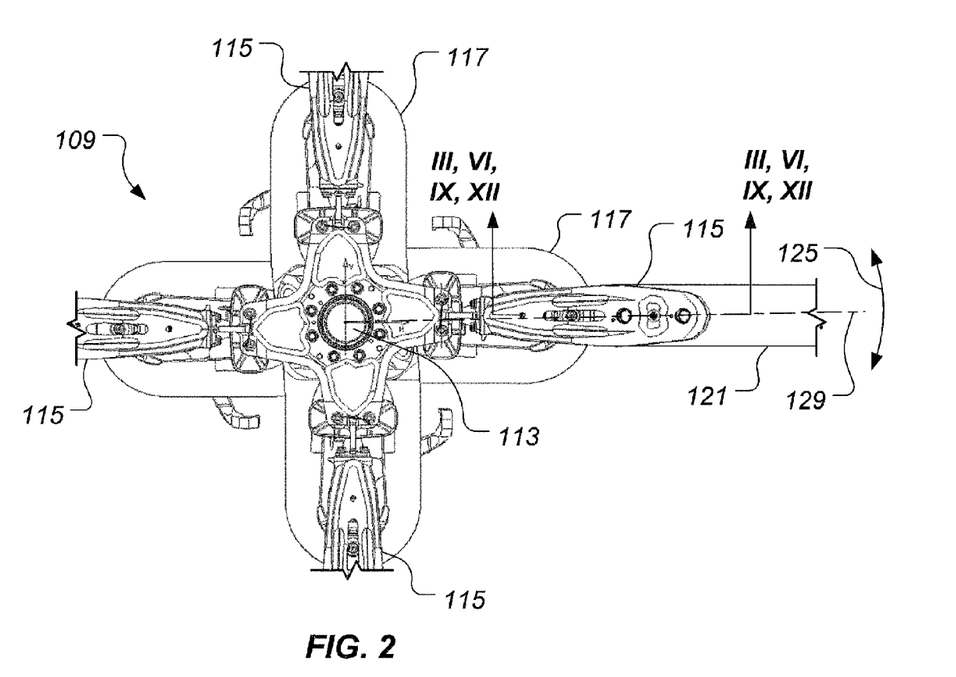
FIG. 2 is a top sectional view of the main rotor hub, taken at section lines II-II in FIG. 1, according to the illustrative embodiment of the present application.
Figure 3:
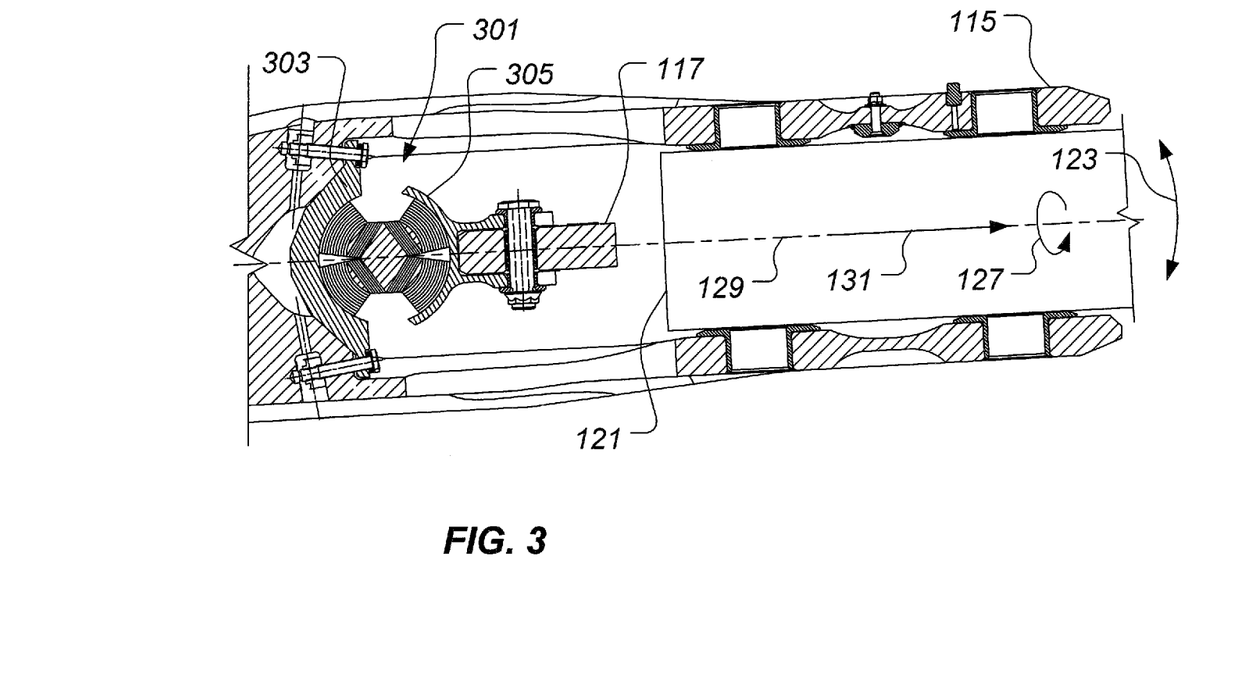
FIG. 3 is a cross-sectional view of the main rotor hub, taken from section lines III-III in FIG. 2, according to the illustrative embodiment of the present application.

Referring now also to FIGS. 2 and 3, main rotor hub 109 further includes rotor yokes 117 and rotor grips 115. Each rotor grip 115 is configured for receiving and coupling to a rotor blade 121. A propulsion system provides torque to a rotor mast 113. Stacked yokes 117 are coupled to rotor mast 113 such that rotation of rotor mast 113 causes the yokes 117 and rotor blades 121 to rotate about the rotor mast axis of rotation.

The operation of rotorcraft 101 results in a plurality of dynamic forces that rotor hub 109 is configured to react. Performance of rotorcraft 101 can be optimized in part by the efficient reaction of the rotor dynamic forces. The dynamic rotor forces can be the source of vibration; however, optimized treatment of those dynamic forces can not only result in a comfortable ride for the crew, but also allow the rotorcraft airframe to be designed and built more structurally efficient.

In the illustrated embodiment, main rotor hub 109 is configured as a hinge-less, soft-in-plane rotor hub. For example, rotor hub 109 does not have a discreet flapping hinge; rather flapping of rotor blades 121 is partially reacted by flexure regions in each yoke 117. Operation of rotor hub 109 not only causes the aforementioned flapping motion, illustrated as a flapping motion 123, but also a lead/lag motion 125, and a torsional motion 127. Further, operation of rotor hub 109 creates a centrifugal force 131; the centrifugal force 131 being generated by the rotating mass of each rotor blade 109.

A bearing system 301 is configured to treat and react the dynamic loads of the centrifugal force 131, flapping motion 123, lead/lag motion 125, and torsional motion 127. Dynamic loads experienced by rotor blade 109 are transferred from rotor blade 109 into rotor grip 115. An inboard bearing support 303 is rigidly coupled to rotor grip 115, while an outboard bearing support 305 is rigidly coupled to rotor yoke 117. Rotor yoke 117 is rigidly coupled to rotor mast 113; as such, the bearing system 301 is configured to react dynamic movements of rotor blade 109 relative to rotor yoke 117.

Figure 4:
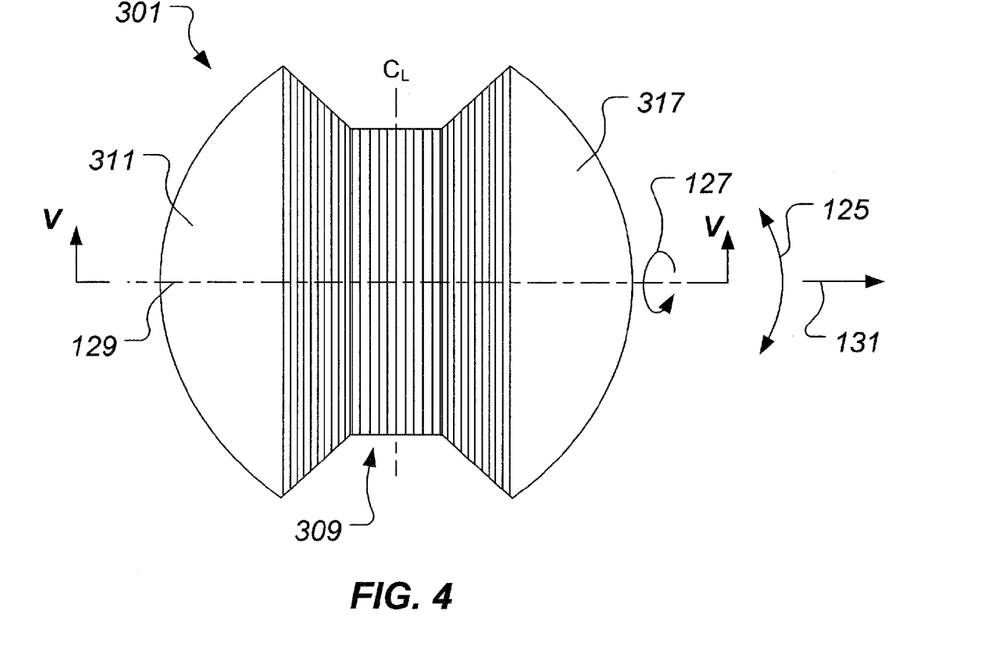
FIG. 4 is a top detail view of a bearing system of FIG. 3, according to an illustrative embodiment of the present application.
Figure 5:
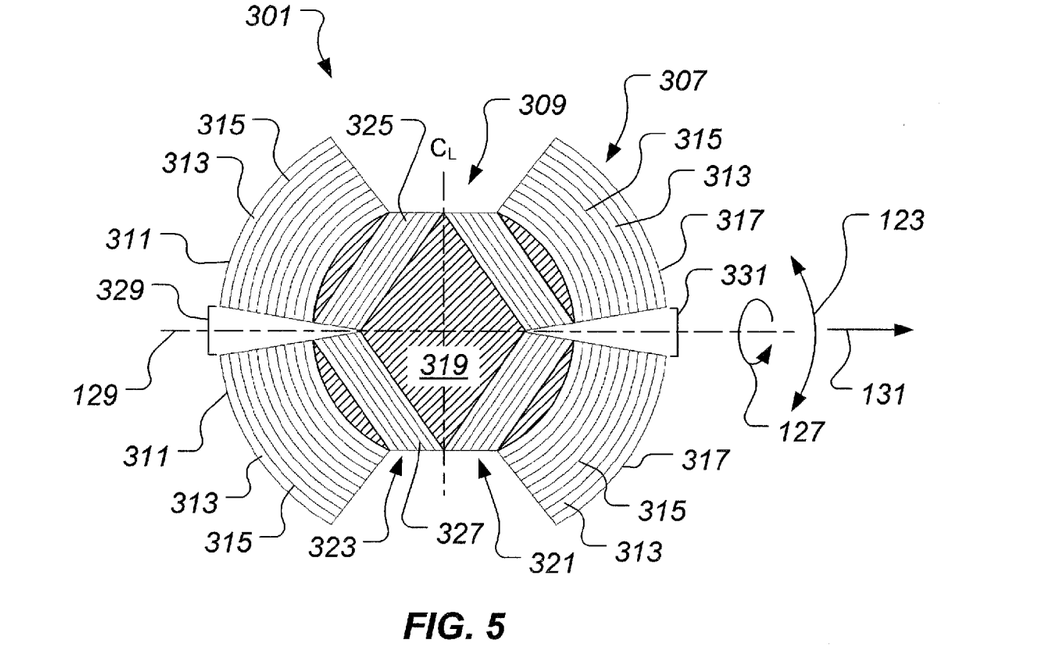
FIG. 5 is a cross-sectional view of the bearing system of FIG. 3, taken from section lines V-V in FIG. 4, according to the illustrative embodiment of the present application.

Referring now also to FIGS. 4 and 5, bearing system 301 is further illustrated. Bearing system 301 includes an outer member 307 and an inner member 309. Outer member 307 includes alternating bonded layers of elastomeric members 313 and nonresilient shim members 315. Outer member 307 includes an inboard exterior surface 311 that is bonded to inboard bearing support 303. Outer member 307 similarly includes an outboard exterior surface 317 that is bonded to outboard bearing support 305. Inboard exterior surface 311 and outboard exterior surface 317 are preferably partial spherical surfaces that mate with the partial spherical surfaces of inboard bearing support 303 and outboard bearing support 305, respectively. Further, the interior surfaces of outer member 307 are bonded to inner member 309. One or more void spaces, such as void spaces 329 and 331 may be used to tailor operational deformation of the elastomeric members.

In prior art rotor bearings, such as the bearing disclosed in U.S. Pat. No. 5,601,408, the inner member of the bearing is a solid member. As such, bearing 408' must be sized and configured with the outer member having a stiffness sufficient to treat all flapping motions, lead/lag motions, and torsional motions. As such, bearing 408' is typically constrained by the most severe motion and can't be specifically tailored for more than one dynamic motion. It should be appreciated that further distinctions exist between the system of the present application and the disclosure of U.S. Pat. No. 5,601,408.

Referring again to FIGS. 3-5, inner member 309 includes an inboard cone member 323 and an outboard cone member 321, each cone member 321 and 323 being bonded within a rigid inner core 319. Inner member 309 is bonded to outer member 307. Inboard cone member 323 and outboard cone member 321 each include a plurality of alternating inner member elastomeric layers 325 and inner member shim layers 327 bonded together. Inner cone member 323 and outer cone member 321 are each symmetrically cone shaped, the geometry of each cone shape can be described as sweep or revolution about axis 129. Inner cone member 323 has a narrow portion and a wide portion, the wide portion being approximate the centerline of the inner member 309, with the narrow portion being approximate the inboard portion of inner member 309. Outboard cone member 321 has a narrow portion and wide portion, the wide portion being approximate the centerline of the inner member 309, with the narrow portion being approximate the outboard portion of inner member 309. Cone members 321 and 323 are located such that pitch change axis 129 forms a centerline through a central axis of each cone member 321 and 323.

During operation of rotorcraft 101, bearing system 301 is configured to treat and react the dynamic loads of the centrifugal force 131, flapping motion 123, lead/lag motion 125, and torsional motion 127. The elastomeric layers have spring and damper characteristics that are exhibited when subjected to a deforming shearing motion. The elastomeric layers behave relatively rigid when subjected to a force normal to the shim surface. Inner cone member 323 and outer cone member 321 act nearly rigid in response to centrifugal force 131, lead/lag motion 125, and flapping motion 123, due to the cone shaped geometries. However, inner cone member 323 and outer cone member 321 will shear and deform in response to torsional motion 127. More specifically, torsional motion 127 acts to resiliently deform inner member elastomeric layers 325 between each shim layer 327 by a shearing force. Further, a selective change in the pitch of rotor blade 121 creates a rotational movement about pitch change axis 129. The inner member 309 partially treats torsional motion 127 by the elastic shearing deformation of elastomeric layers 325 in each cone member 321 and 323. Outer member 307 can be sized with a stiffness tailored to treat lead/lag motion 125 and flapping motion 123, while inner member 309 can be tailored to provide supplemental torsional compliance and stiffness for torsional motion 127. Such a configuration can reduce an overall size of bearing system 301 that may otherwise have a larger diameter in order to provide torsional compliance. As such, the total torsional stiffness of bearing system 301 is a combination of the torsional stiffness contributions from inner member 309 and outer member 307, thus allowing the total torsional stiffness to be tailored by tailoring the torsional stiffness of inner member 309.

It should be appreciated that elastomeric layers can have spring and dampener characteristics that are configured to treat and react the motion or force that causes the deformation of the elastomeric layer. To achieve such spring and damper characteristics, elastomeric layers have visco-elastic properties. Exemplary elastomeric materials can include a natural or synthetic rubber. The shim layers can be formed of a rigid material, such as a metal. An exemplary thickness of the elastomeric layers is 0.040 inch, while an exemplary thickness of a shim layer is 0.025 inch. It should be appreciated that the exact material and thickness of each elastomeric and shim layers are implementation specific.

Figure 6:
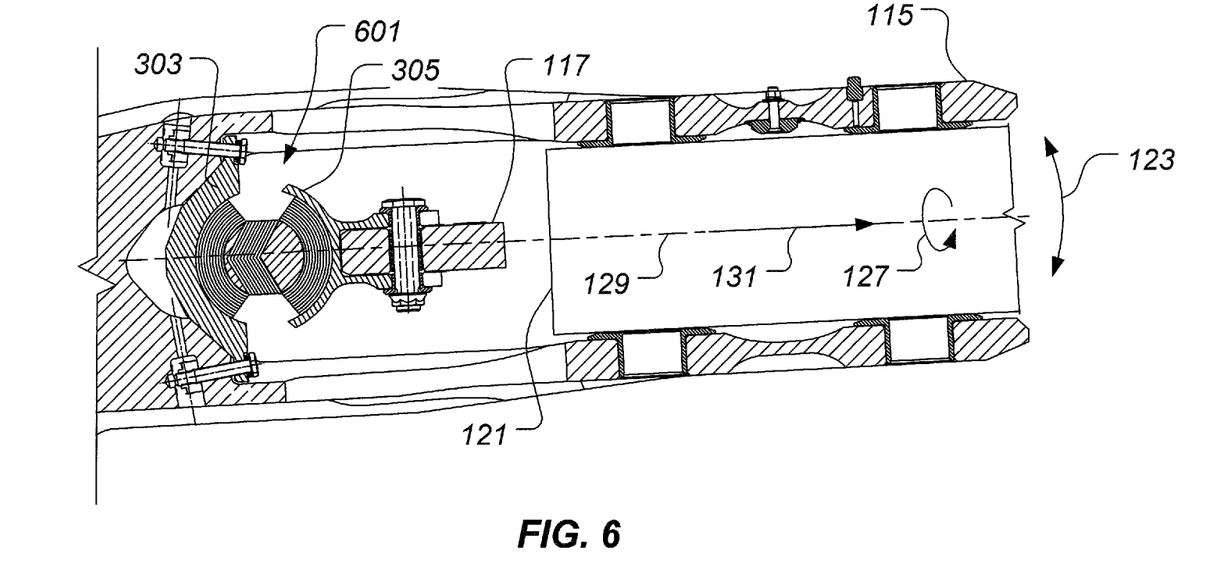
FIG. 6 is a cross-sectional view of the main rotor hub, taken from section lines VI-VI in FIG. 2, according to the illustrative embodiment of the present application.
Figure 7:
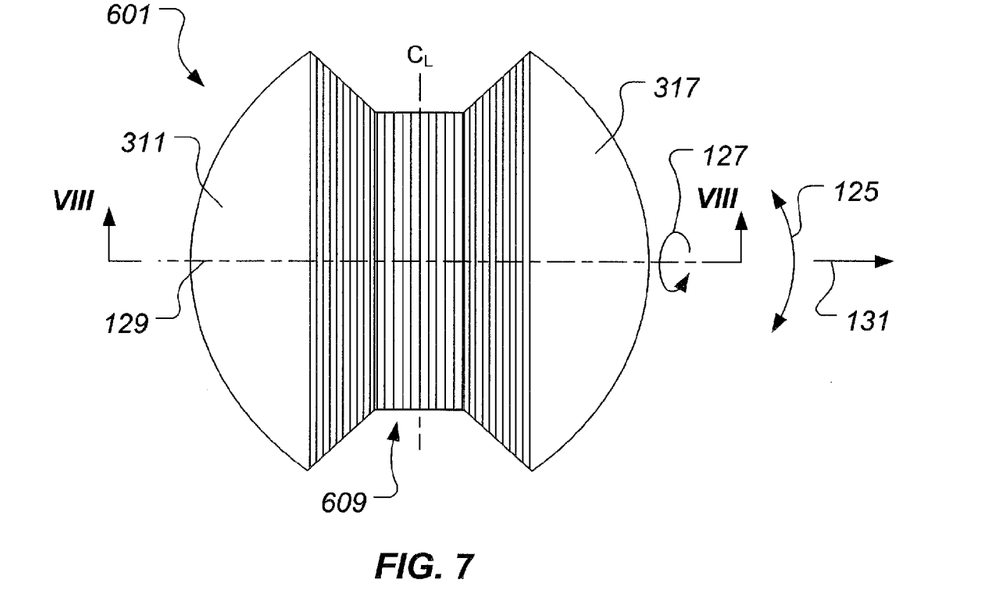
FIG. 7 is a top detail view of a bearing system of FIG. 6, according to an illustrative embodiment of the present application.
Figure 8:
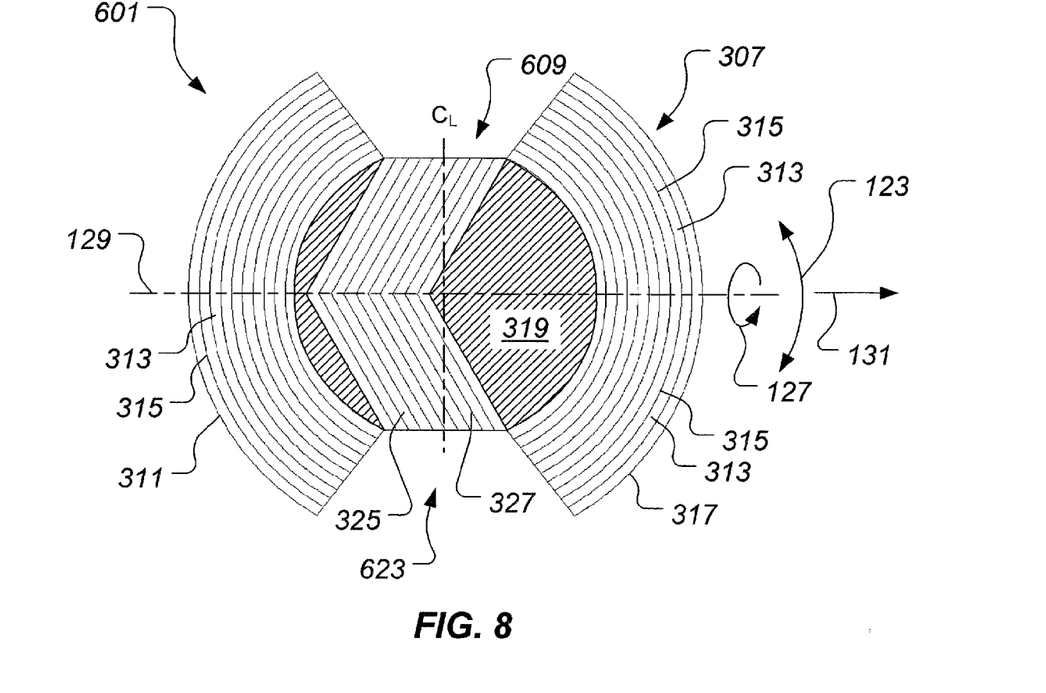
FIG. 8 is a cross-sectional view of the bearing system of FIG. 6, taken from section lines VIII-VIII in FIG. 7, according to the illustrative embodiment of the present application.

Referring now to FIGS. 6-8, a bearing system 601 is illustrated. Bearing system 601 is substantially similar to bearing system 301 in form and function. However, bearing system 601 includes an inner member 609 having a single cone member 623. Cone member 623 is symmetrically cone shaped, such that the geometry of the cone shape can be described as sweep or revolution about axis 129. Cone member 623 has a narrow portion and a wide portion, the wide portion being located toward an outboard portion of inner member 609, with the narrow portion being approximate the inboard portion of inner member 609.

Similar to bearing system 301, bearing system 601 has a cone member 623 that acts nearly rigid in response to centrifugal force 131, lead/lag motion 125, and flapping motion 123, due to the cone shaped geometry of cone member 623. However, cone member 623 will shear and deform in response to torsional motion 127. More specifically, torsional motion 127 acts to resiliently deform inner member elastomeric layers 325 between each shim layer 327. Outer member 307 can be sized with a stiffness tailored to treat lead/lag motion 125 and flapping motion 123, while inner member 609 can be tailored to provide a desired torsional stiffness for torsional motion 127. Such a configuration can reduce an overall size of bearing system 601 that may otherwise have a larger diameter in order to provide torsional compliance. As such, the total torsional stiffness of bearing system 601 is a combination of the torsional stiffness contributions from inner member 609 and outer member 307, thus allowing the total torsional stiffness to be tailored by tailoring the torsional stiffness of inner member 609.

Figure 9:
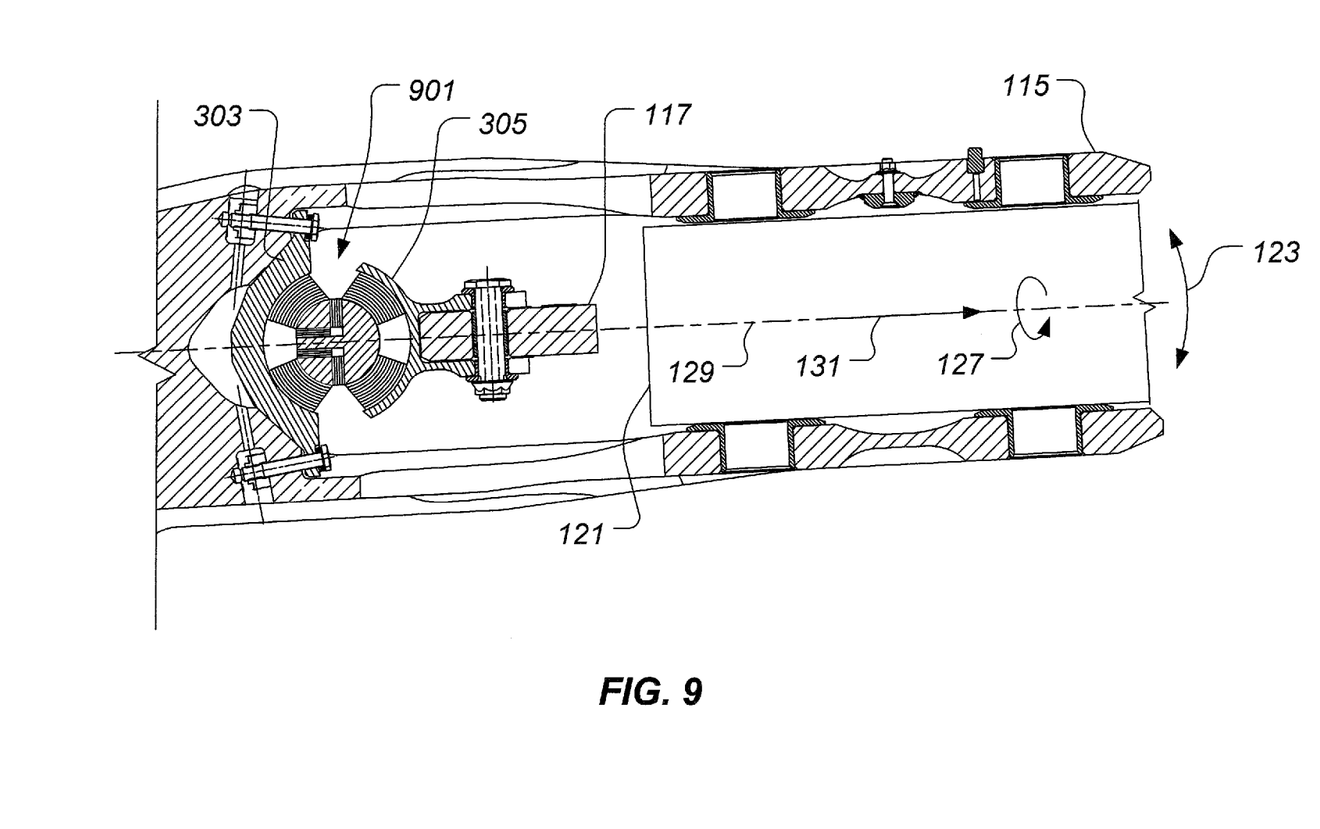
FIG. 9 is a cross-sectional view of the main rotor hub, taken from section lines IX-IX in FIG. 2, according to the illustrative embodiment of the present application.
Figure 10:
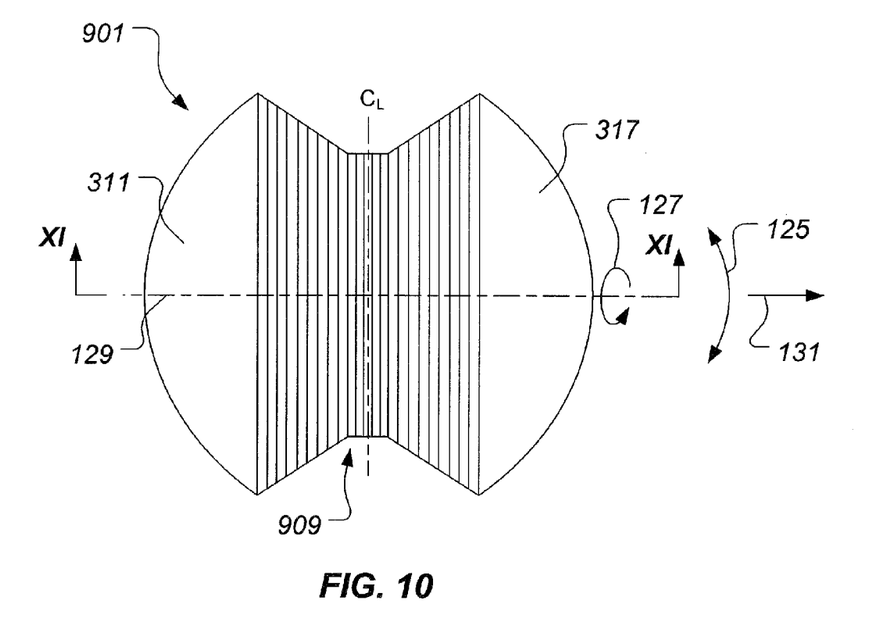
FIG. 10 is a top detail view of a bearing system of FIG. 9, according to an illustrative embodiment of the present application.
Figure 11:
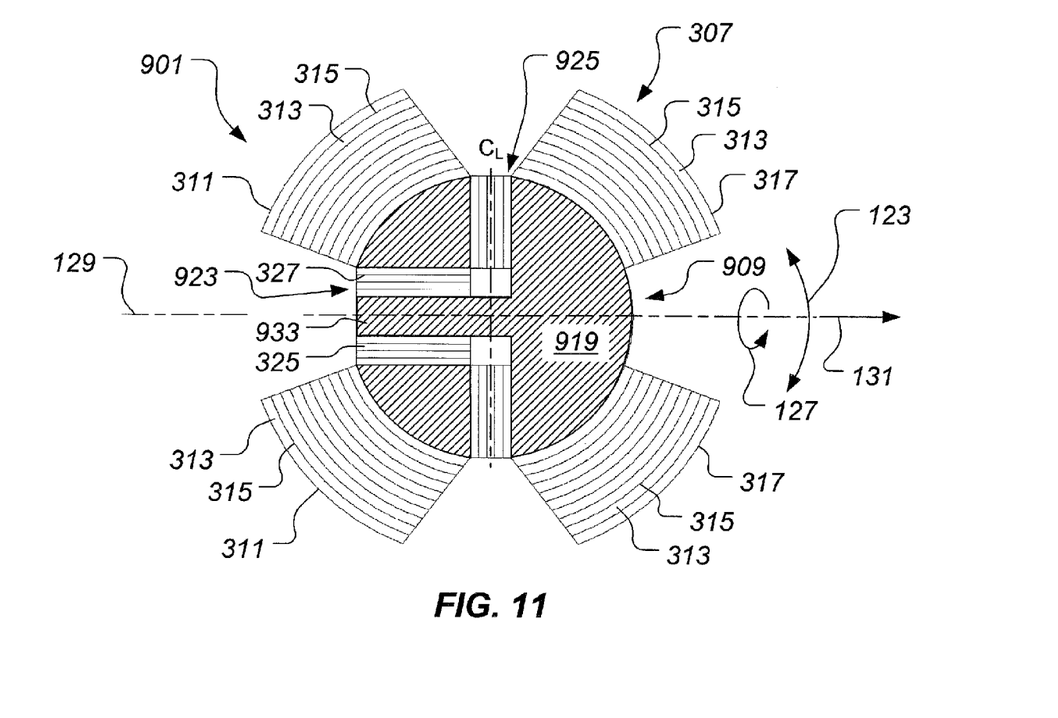
FIG. 11 is a cross-sectional view of the bearing system of FIG. 9, taken from section lines XI-XI in FIG. 10, according to the illustrative embodiment of the present application.

Referring now to FIGS. 9-11, a bearing system 901 is illustrated. Bearing system 901 includes an outer member 307 that is substantially similar to that of bearing system 301. However, bearing system 901 includes an inner member 909 having a journal bearing 923 preferably located in an inboard portion of inner member 909. Journal bearing 923 includes alternating elastomeric layers 325 and shim layers 327 located in a cylindrical orientation through inner member 909. Journal bearing 923 is cylinder shaped; the geometry of the cylinder shape can be described as sweep or revolution about axis 129. Inner member 909 also includes a flat bearing 925 having alternating elastomeric layers 325 and shim layers 327 located in a vertical orientation through inner member 909. Flat bearing 925 is preferably located on a centerline of inner member 909. Flat bearing 925 is toroidal shaped; the geometry of the toroidal shape can be described as a sweep or revolution about axis 129. Inner member 909 further includes a rigid inner core 919 having an integral spindle member 933 that extends within journal bearing 923. Rigid spindle member 933 is configured to transfer shear loads to journal bearing 923. A void portion may be located between the intersections of flat bearing 925 and journal bearing 923.

The journal bearing 923 acts nearly rigid in response to lead/lag motion 125 and flapping motion 123, due to the cylindrical shape of the elastomeric layers 325 and shim layers 327. However, journal bearing 923 will shear and deform in response to torsional motion 127 since the axis of journal bearing 923 is coaxial with pitch change axis 129. The flat bearing 925 acts nearly rigid in response to centrifugal force 131, flapping motion 123, and lead/lag motion 125, due to the vertical orientations of the elastomeric layers 325 and shim layers 327. However, flat bearing 925 will shear and deform in response to torsional motion 127. More specifically, torsional motion 127 acts to resiliently deform elastomeric layers 325 between each shim layer 327 in inner member 909. Outer member 307 can be sized with a stiffness tailored to treat lead/lag motion 125 and flapping motion 123, while inner member 909 can be tailored to provide sufficient torsional stiffness for torsional motion 127. Such a configuration can reduce an overall size of bearing system 901 that may otherwise have a larger diameter in order to provide all of the necessary torsional compliance. As such, the total torsional stiffness of bearing system 901 is a combination of the torsional stiffness contributions from inner member 909 and outer member 307, thus allowing the total torsional stiffness to be tailored by tailoring the torsional stiffness of inner member 909.

Figure 12:
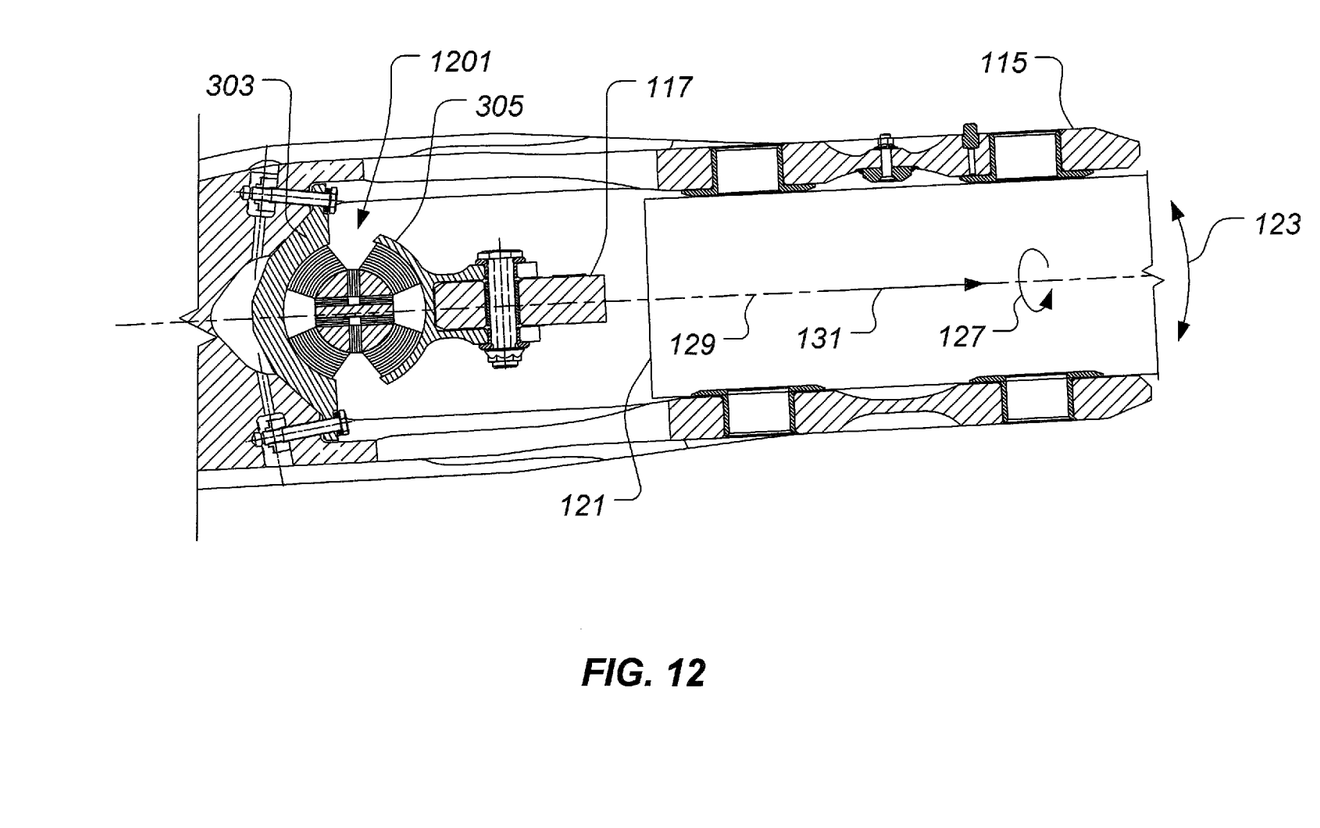
FIG. 12 is a cross-sectional view of the main rotor hub, taken from section lines XII-XII in FIG. 2, according to the illustrative embodiment of the present application.
Figure 13:
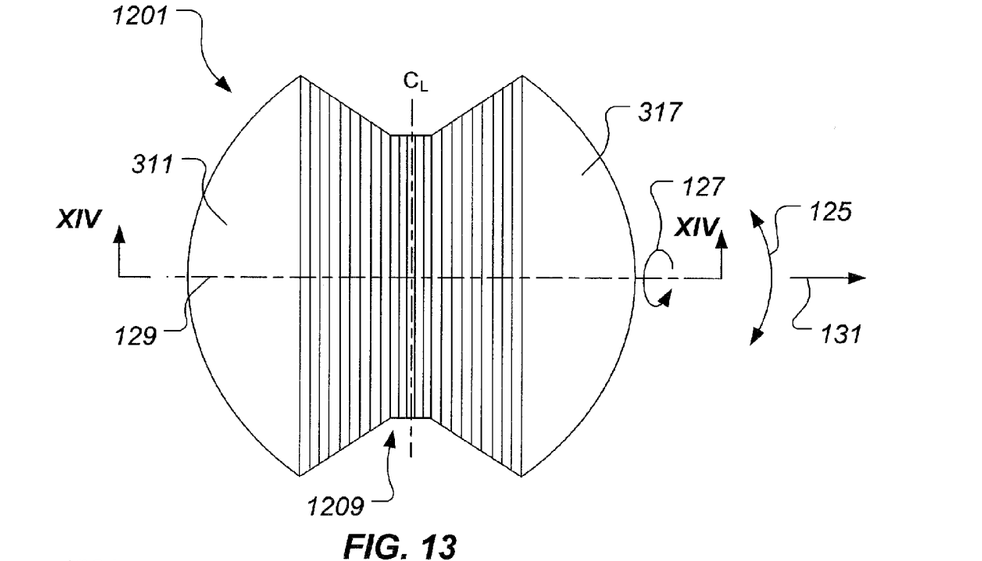
FIG. 13 is a top detail view of a bearing system of FIG. 12, according to an illustrative embodiment of the present application.
Figure 14:
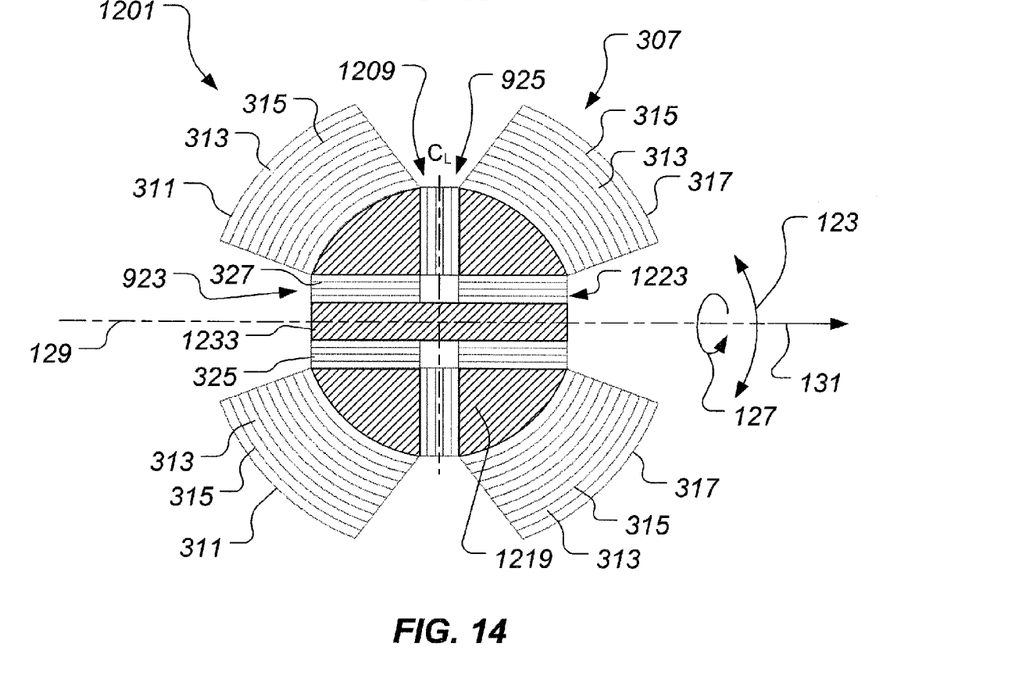
FIG. 14 is a cross-sectional view of the bearing system of FIG. 12, taken from section lines XIV-XIV in FIG. 13, according to the illustrative embodiment of the present application.

Referring now to FIGS. 12-14, a bearing system 1201 is illustrated. Bearing system 1201 is substantially similar to bearing system 901 in form and function. However, bearing system 1201 includes a rigid inner core 1219 having an integral spindle member 1233 within a journal bearing 1223, journal bearing 1223 being a mirror image of journal bearing 923 about a vertical centerline. Further, journal bearing 1223 includes alternating elastomeric layers 325 and shim layers 327 located in a cylindrical orientation through inner member 1209. Similar to journal bearing 923, journal bearing 1223 is cylinder shaped; the geometry of the cylinder shape can be described as sweep or revolution about axis 129.

Similar to the journal bearing 923 in bearing system 901, journal bearing 1223 acts nearly rigid in response to lead/lag motion 125 and flapping motion 123, due to the cylindrical shape of the elastomeric layers 325 and shim layers 327. Further, journal bearings 923 and 1223 will shear and deform in response to torsional motion 127. The flat bearing 925 acts nearly rigid in response to centrifugal force 131, flapping motion 123, and lead/lag motion 125, due to the vertical orientations of the elastomeric layers 325 and shim layers 327. However, flat bearing 925 will shear and deform in response to torsional motion 127. More specifically, torsional motion 127 acts to resiliently deform elastomeric layers 325 between each shim layer 327 in inner member 1209. Outer member 307 can be sized with a stiffness tailored to treat lead/lag motion 125 and flapping motion 123, while inner member 1209 can be tailored to provide a desired torsional stiffness for torsional motion 127. Such a configuration can reduce an overall size of bearing system 1201 that may otherwise have a larger diameter in order to provide all of the necessary torsional compliance. As such, the total torsional stiffness of bearing system 1201 is a combination of the torsional stiffness contributions from inner member 1209 and outer member 307, thus allowing the total torsional stiffness to be tailored by tailoring the torsional stiffness of inner member 1209.

It should be appreciated that bearing systems 301, 601, 901, and 1209 may each be installed so that the outboard portion is located inboard, such that the bearing is oriented in a 180° rotation around the centerline axis. For example, bearing system 301 can be installed such that inboard exterior surface 311 bears against outboard bearing support 305, while outboard exterior surface 317 bears against inboard bearing support 303.

The bearing system of the present application provides significant advantages, including: 1) reducing the size of the bearing, 2) increasing the geometric efficiency of the bearing; 3) providing a bearing with an inner member for tailoring the torsional stiffness of the bearing; and 4) reducing the total torsional spring rate of the bearing by having an inner member that adds torsional compliance, thereby reducing steady torsional loading and torsional loading requirements of structural parts in the rotor hub.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A bearing system for an aircraft, the system comprising:
   an outer member having a plurality of alternating outer elastomeric layers and shim layers, wherein the outer member has an inboard surface configured for bonding to an inboard bearing support, and wherein the outer member has an outboard surface configured for bonding to an outboard bearing support;
   an inner member bonded to an interior surface of the outer member, the inner member comprising:
   a rigid inner core; and
   a cone shaped member having alternating inner member elastomeric layers and inner member shim layers, the cone shaped member having a center axis corresponding to a pitch change axis of a rotor blade;
   wherein the cone shaped member is configured to react torsional movements of the rotor blade.

2. The system according to claim 1, wherein the cone shaped member has a narrow portion that is located approximate an inboard portion of the rigid inner core.

3. The system according to claim 2, wherein the cone shaped member has a wide portion that is outboard of the narrow portion.

4. The system according to claim 1, wherein the cone shaped member is configured to be nearly rigid in response to a flapping motion of the rotor blade.

5. The system according to claim 1, wherein the cone shaped member is configured to be nearly rigid in response to a lead/lag motion of the rotor blade.

6. The system according to claim 1, wherein cone shaped member is bonded to the rigid inner core.

7. The system according to claim 1, wherein outboard bearing support is coupled to a rotor yoke in a rotor hub, the rotor yoke having a flapping flexure for partially treating flapping movements of the rotor blade.

8. The system according to claim 1, wherein the inboard bearing support is coupled to a rotor grip, the rotor grip configured for securing the rotor blade.

9. The system according to claim 1, the inner member further comprising:
   a second cone shaped member also having alternating inner member elastomeric layers and inner member shim layers;
   wherein the second cone shaped member has a narrow portion that is located approximate an outboard portion of the rigid inner core.

10. The system according to claim 9, wherein the second cone shaped member has a wide portion that is inboard of the narrow portion.

\* \* \* \* \*